(12) United States Patent
Maier et al.

(10) Patent No.: US 9,085,293 B2
(45) Date of Patent: Jul. 21, 2015

(54) METHOD FOR CONTROLLING SHIFTING IN A SEMI-AUTOMATIC GEAR TRANSMISSION

(75) Inventors: Alexander Maier, Friedrichshafen (DE); Maik Wuerthner, Markdorf (DE); Joachim Staudinger, Memmingen (DE); Johannes Kemler, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 213 days.

(21) Appl. No.: 13/825,402

(22) PCT Filed: Aug. 3, 2011

(86) PCT No.: PCT/EP2011/063383
§ 371 (c)(1),
(2), (4) Date: Mar. 21, 2013

(87) PCT Pub. No.: WO2012/038139
PCT Pub. Date: Mar. 29, 2012

(65) Prior Publication Data
US 2013/0179045 A1 Jul. 11, 2013

(30) Foreign Application Priority Data

Sep. 24, 2010 (DE) .......................... 10 2010 041 324

(51) Int. Cl.
*G06F 19/00* (2011.01)
*F16H 59/36* (2006.01)
(Continued)

(52) U.S. Cl.
CPC .............. *B60W 10/11* (2013.01); *B60W 10/184* (2013.01); *F16H 61/0213* (2013.01);
(Continued)

(58) Field of Classification Search
None
See application file for complete search history.

(56) References Cited

U.S. PATENT DOCUMENTS 5,281,190 A * 1/1994 Koivunen ...................... 475/116
5,655,990 A * 8/1997 Ooyama et al. ................. 477/15
(Continued)

FOREIGN PATENT DOCUMENTS

DE      44 46 111 A1     7/1995
DE      101 42 274 A1     3/2003
(Continued)

OTHER PUBLICATIONS

German Search Report Corresponding to DE 10 2010 041 324.0.
(Continued)

*Primary Examiner* — James Trammell
*Assistant Examiner* — Demetra Smith-Stewart
(74) *Attorney, Agent, or Firm* — Davis & Bujold, P.L.L.C.; Michael J. Bujold (57) ABSTRACT

A method of shift control for an automatic transmission of vehicle power train, having a permanent brake between a drive motor and a final drive, in which current vehicle-specific, road-specific and driver-specific operating parameters, topographical data relating to an upcoming stretch of road ahead of the vehicle are determined while driving, and from which a tractive resistance value for the upcoming stretch of road is determined, and control commands for thrust downshifts and/or upshifts are derived and implemented, within the transmission, during a thrust operation depending upon the tractive resistance value. This is achieved in that the maximum permanent braking force curves that are possible for the upcoming stretch of road, in the currently engaged gear, and each adjacent gear is determined based on the current traveling and engine speeds and analyzed to derive control commands for a thrust downshift and/or upshift in relation to the tractive resistance value.

20 Claims, 2 Drawing Sheets

(51) Int. Cl.
  *F16H 59/66* (2006.01)
  *B60W 10/11* (2012.01)
  *F16H 61/21* (2006.01)
  *B60W 10/184* (2012.01)
  *F16H 61/02* (2006.01)
  *B60W 40/072* (2012.01)
  *B60W 40/076* (2012.01)

(52) U.S. Cl.
  CPC ............. *F16H 61/21* (2013.01); *B60W 40/072* (2013.01); *B60W 40/076* (2013.01); *B60W 2550/143* (2013.01); *F16H 59/66* (2013.01); *F16H 2059/366* (2013.01); *F16H 2059/663* (2013.01); *F16H 2061/0234* (2013.01); *F16H 2061/0237* (2013.01)

(56) References Cited

U.S. PATENT DOCUMENTS

| | | | | |
|---|---|---|---|---|
| 5,928,107 | A | * | 7/1999 | Bieber ............................ 477/97 |
| 7,469,178 | B2 | * | 12/2008 | Shiiba et al. .................... 701/70 |
| 8,229,634 | B2 | | 7/2012 | Winkel |
| 2010/0324793 | A1 | * | 12/2010 | Winkel ............................ 701/65 |
| 2011/0153173 | A1 | * | 6/2011 | Wolfgang et al. ............... 701/58 |

FOREIGN PATENT DOCUMENTS

| | | |
|---|---|---|
| DE | 10 2005 021 713 A1 | 11/2006 |
| DE | 10 2005 050 753 A1 | 4/2007 |
| DE | 10 2006 001 818 A1 | 7/2007 |
| DE | 10 2007 044 432 A1 | 3/2009 |
| DE | 10 2008 023 135 A1 | 11/2009 |
| EP | 1 750 038 A2 | 2/2007 |
| WO | 2006/119937 A1 | 11/2006 |
| WO | 2007/045332 A1 | 4/2007 |

OTHER PUBLICATIONS

International Search Report Corresponding to PCT/EP2011/063383.
Written Opinion Corresponding to PCT/EP2011/063383.

* cited by examiner

METHOD FOR CONTROLLING SHIFTING IN A SEMI-AUTOMATIC GEAR TRANSMISSION

This application is a National Stage completion of PCT/EP2011/063383 filed Aug. 3, 2011, which claims priority from German patent application serial no. 10 2010 041 324.0 filed Sep. 24, 2010.

FIELD OF THE INVENTION

The invention relates to a method of shift control for an automatic stepped variable speed transmission.

BACKGROUND OF THE INVENTION

Modern stepped variable speed transmissions such as automated transmissions, planetary automatic transmissions and double clutch transmissions can be operated both in a manual mode as well as in an automatic mode. In the manual mode, shiftings can be directly initiated by the driver, for example when the driver manually deflects a gearshift lever provided for this purpose in order to upshift or downshift. In the automatic mode, however, shiftings are initiated automatically by determining current vehicle-, road- and driver-specific operating parameters and initiating shiftings on the basis of gear change characteristics or shifting characteristics. These operating parameters can include the current traveling speed, the current driving acceleration, the current engine speed, the current engine torque, the current vehicle mass, the current road inclination (uphill, flat, downhill), the current tractive resistance and the current driver's intention (the performance requirements of the driver, or a cruise control system or Tempomat™). The current operating parameters can either be measured directly, or be calculated from measured values. Likewise, the respective current gradient can be determined and used for shift control. For example, the current driver's intention can be determined by means of an associated characteristic curve from the position of the accelerator pedals, measurable via a potentiometer. In addition, the calculable rate of change of the accelerator pedal position over time, or in other words the control speed, can also be used.

Based on current operating parameters and if applicable, also on their gradients, the shift control or automatic stepped variable speed transmissions delivers good results in most operating conditions, including high dynamic performance, low fuel consumption and a high level of shifting and driving comfort. There are frequently late or awkward shiftings in the thrust operation however, especially in the transition between different road gradients and driving resistances, since conventional methods of shift control do not, or do not sufficiently, take into account the topography of the stretch of road that lies ahead of the motor vehicle.

So, for example, a transition on a stretch of road with a downgrade is frequently detected too late in a section of the road having a greater downgrade based on current operating parameters, so that the motor vehicle is already accelerated under the effect of an increased downhill force and a thrust downshift needed to limit the traveling speed is delayed and therefore is initiated at an increased traveling speed. On the other hand, a thrust downshift may not infrequently be unnecessarily initiated due to a currently greater downgrade in the road, if the stretch of road with a downgrade then transitions back to a section of the road having a lesser downgrade in a short distance, which would then again entail a thrust upshift.

Similarly, in a transition from a downgrade into a level stretch, the leveling off of the downgrade in question is frequently detected too late due to current operating parameters, so that a thrust upshift, which is appropriate in this instance, is initiated too late, whereby the momentum of the motor vehicle (potential and kinetic energy) is inadequately exploited and a transition into traction mode is necessary earlier than is possible. On the other hand, a thrust upshift may also be unnecessarily initiated due to a currently lesser downgrade in the road if the stretch of road with a downgrade then transitions back to a section of the road having a greater downgrade in a short distance, which would then again entail a thrust downshift.

In order to further improve the shifting behavior of automatic stepped variable speed transmissions, some methods and devices have already been suggested, which provide for the compiling of topographic data that relates to a stretch of road that lies ahead of the motor vehicle, in particular of the elevation profile, and taking that profile into consideration during the shift control of an automatic stepped variable speed transmission.

Thus, in the document DE 101 42 274 A1, a method for controlling and/or regulating the vehicle speed is suggested, in which, in connection with an operation of a brake control system (Bremsomat) and/or a cruise control system (Tempomat™), the target speed of the Bremsomat or Tempomat is dynamically modified. The known method provides that entry into an incline as well as in a leveling off of the downgrade is detected through the evaluation of current operating parameters, their gradients and information pertaining to the stretch of road such as, in particular, topography data, and in these cases, the target speed of the Bremsomat or the Tempomat is detected in a timely manner.

In the document DE 10 2006 001 818 A1, a method and a device for driver assistance in the driving operation of a commercial vehicle are described, for which the topography data that pertains to the stretch of road that lies ahead of the motor vehicle on the travel section can be retrieved from a memory and evaluated with the aid of a computer when adjusting the driving operation components, in particular when the transmission control sets a gear of the transmission. The topography data can be stored in the form of an elevation profile or a gradient profile for the respective travel section.

Finally, a method and a device for controlling and/or regulating an automatic system of a motor vehicle are known from document DE 10 2005 050 753 A1, for which data is collected in order to detect a stretch of road that lies ahead of the motor vehicle and combined into a tractive resistance profile of a motor vehicle. The tractive resistance profile that is calculated should be used inter alia in an automatic transmission, to set an appropriate gear ratio in order to manage the stretch of road that lies ahead of the motor vehicle.

The methods and devices known from the prior art provide useful approaches for improving the shifting behavior of automatic stepped variable speed transmissions. Specific information about how control commands are derived from topography data that pertains to the stretch of road that lies ahead of the motor vehicle such as the elevation profile, the gradient profile or the tractive resistance profile, and how those commands are implemented in the transmission control cannot be found in the above mentioned documents.

SUMMARY OF THE INVENTION

Against this background, the objective of the invention is to provide a method of shift control for an automatic stepped variable speed transmission of the aforementioned type, with which concrete control commands for thrust downshifts and/or thrust upshifts can be derived from the tractive resistance profile of a motor vehicle for the stretch of road that lies ahead and implemented with the least possible control expenditure in the automatic mode during thrust operation.

This task is solved in such a way that, based on the current traveling speed, the current engine speed, and the tractive resistance profile of the stretch of road that lies ahead, the maximum permanent braking force curves that are possible in the stretch of road that lies ahead in the currently engaged gear and in each gear adjacent to the gear are each determined, and that the maximum permanent braking force curves are analyzed in order to derive control commands for a thrust downshift and/or thrust upshift in relation to the tractive resistance profile.

The invention accordingly emanates from a known automatic stepped variable speed transmission disposed in a motor vehicle power train, which is provided with a permanent brake, such as an engine brake and/or retarder, between a drive motor that is designed as an internal combustion engine and a final drive. In addition to current vehicle-, road- and driver-specific operating parameters, topographical data relating to a road section that lies ahead of a motor vehicle, especially the respective elevation profile, are continuously determined while driving, i.e. in a given timing cycle. The tractive resistance of the motor vehicle for the stretch of road that lies ahead, and therefore tractive resistance profile $F_{FW}(x_F)$, can be determined from the resulting gradient profile, knowing the vehicle mass, the drag coefficient of the vehicle and the rolling resistance coefficient for each waypoint using the known tractive resistance formula $F_{FW}=F_{Luft}+F_{Roll}+F_{Steig}$ as a sum of the drag $F_{Luft}$, the rolling resistance $F_{Roll}$ and the inclination resistance $F_{Steig}$. When the stepped variable speed transmission is operated in the automatic mode and the motor vehicle is in the thrust operation, control commands for thrust downshifts and/or thrust upshifts are determined and implemented based on the tractive resistance profile $F_{FW}(x_F)$. This approach is known in general terms, for example from the document DE 10 2005 050 753 A1.

The method according to the invention now comprises the derivation of concrete control commands for thrust downshifts and/or thrust upshifts as a function of the tractive resistance profile and the implementation of the control commands in the transmission control of an automatic stepped variable speed transmission. It is provided that, based on the current traveling speed, the current engine speed and the tractive resistance profile, the maximum permanent braking force curves that are possible in the stretch of road that lies ahead in the currently engaged gear and in each gear adjacent to the gear are each determined, and that the maximum permanent braking force curves are analyzed in order to derive control commands for a thrust downshift and/or thrust upshift in relation to the tractive resistance profile.

This means that, based on the relative curves of the tractive resistance and the maximum permanent braking force of the gears in question, it is decided whether in deviation from or in addition to the normal shift control, a thrust downshift and/or a thrust upshift should be prematurely initiated or blocked. On this basis, clear decision criteria for initiating or blocking thrust shiftings can be derived in a simple way.

In order to derive control commands for a thrust downshift, the method according to the invention provides that the maximum permanent braking force curves that are possible in the stretch of road that lies ahead in the currently engaged gear and in a fixed number of lower gears, are determined and evaluated in relation to the tractive resistance profile.

Accordingly, a thrust downshift is then prematurely initiated, i.e. before a thrust upshift is initiated by the normal shift control or by an active Bremsomat, when the curve of the maximum permanent braking force for the currently engaged gear exceeds the curve of the tractive resistance based on the current vehicle position within a specified first limit travel time or limit travel section and then does not fall below the curve of the tractive resistance within a specified second limit travel time or limit travel section. Otherwise, i.e. if at least one of the two conditions is not met, a thrust downshift is blocked, so that it also cannot be initiated by the normal shift control, for example due to a current short steep downgrade.

The highest possible respective low gear is appropriately designated as the target gear for the thrust downshift, the maximum permanent braking force curve of which does not exceed the curve of the tractive resistance after the occurrence of the braking force deficiency in the currently engaged gear $G_0$ within the second limit travel time or limit travel section. This ensures that after the implementation of the thrust downshift, there is no longer a braking force deficiency and the motor vehicle is therefore able to maintain the current traveling speed.

When this condition is not met for any of the higher gears, however, i.e. the curve of the maximum permanent braking force of even the lowest of these gears exceeds the curve of the tractive resistance after the occurrence of the braking force deficiency (in the currently engaged gear) within the second limit travel time or limit travel section, the lowest of the respective low gears is designated as the target gear for the thrust downshift. As a result, while the braking force deficiency is not reliably solved, it is at least reduced. Whether an additional downshift is needed in order to completely eliminate the braking force deficiency emerges during the next cycle of the program sequence, in which the maximum permanent braking force curves are determined and evaluated starting from the lower gear then engaged.

For the premature initiation of a thrust downshift, the value of the current tractive resistance can be replaced by the value of the tractive resistance at a waypoint in front of the motor vehicle or by the average value of the tractive resistance profile over a route area in front of the motor vehicle, in which the curve of the maximum permanent braking force for the currently engaged gear is above the curve of the tractive resistance, i.e. a braking force deficiency exists. The thrust downshift is then initiated via the normal shift control by artificially or preemptively decreasing the value of the current tractive resistance, i.e. the amount of which has increased.

In the case of operation using a Bremsomat, the target speed of the Bremsomat can also be temporarily reduced in order to prematurely initiate a thrust downshift, whereby the Bremsomat can initiate the thrust downshift due to the demand on the normal shift control for an increased permanent braking force.

Analogously, the value of the current tractive resistance can be replaced by the value of the tractive resistance at a waypoint in front of the motor vehicle or by the average value of the tractive resistance profile over a route area in front of the motor vehicle in order to block a thrust downshift, in which the curve of the maximum permanent braking force for the currently engaged gear is below the curve of the tractive resistance, i.e. there is no braking force deficiency present.

Similarly, the target speed $v_{Soll}$ of the Bremsomat can be temporarily increased during Bremsomat operation, in order to block a thrust downshift.

In order to derive control commands for a thrust upshift, the method according to the invention provides that in addition, the maximum permanent braking force curves that are possible in the stretch of road that lies ahead in the currently engaged gear and in a fixed number of lower gears, are determined and evaluated in relation to the tractive resistance profile.

Accordingly, a thrust upshift is then initiated prematurely when the curve of the maximum permanent braking force for the currently engaged gear is or falls below the curve of the tractive resistance based on the current vehicle position within a specified first limit travel time or limit travel section, and when the curve of the maximum permanent braking force of at least one higher gear does not subsequently exceed the curve of the tractive resistance within a specified second limit travel time or limit travel section. Otherwise, i.e. if at least one of the two conditions is not met, a thrust upshift is blocked so that this upshift also cannot be initiated by the normal shift control, for example due to a current short flatter gradient and thus an erroneously identified leveling off of the downgrade.

The highest possible of the higher gears is preferably designated as a target gear of the thrust upshift, for which the curve of the permanent braking force does not exceed the curve of the tractive resistance within the second limit travel time or limit travel section. This ensures that no braking force deficit occurs in the higher gear. When this condition is not met for any of the higher gears, however, a thrust upshift is likewise blocked, since this upshift is not possible without the occurrence of a braking force deficiency.

In order to prematurely initiate a thrust upshift, the value of the current tractive resistance can be replaced by the value of the tractive resistance at a waypoint in front of the motor vehicle or by the average value of the tractive resistance profile over a route area in front of the motor vehicle, in which the curve of the maximum permanent braking force for the currently engaged gear is below the curve of the tractive resistance. The thrust upshift is initiated via the normal shift control by artificially or preemptively decreasing the value of the current tractive resistance, i.e. the amount of which has decreased.

During Bremsomat operation, the target speed of the Bremsomat can be temporarily increased in order to prematurely initiate a thrust upshift, whereby the Bremsomat can initiate the thrust downshift due to the demand on the normal shift control for a decreased permanent braking force.

Analogously, the value of the current tractive resistance can be replaced by the value of the tractive resistance at a waypoint in front of the motor vehicle or by the average value of the tractive resistance profile over a route area in front of the motor vehicle in order to block a thrust downshift, in which the curve of the maximum permanent braking force for the currently engaged gear is above the curve of the tractive resistance.

Similarly, the target speed of the Bremsomat can be temporarily increased during Bremsomat operation, in order to block a thrust upshift.

The premature initiation of a thrust downshift preferably occurs within the travel time or travel section until the occurrence of a braking force deficiency in the currently engaged gear, since this reliably prevents the occurrence of a longer braking force deficiency. The premature initiation of a thrust upshift advantageously occurs within the first limit travel time or limit travel section however, since this ensures that the thrust upshift is carried out early without the occurrence of a braking force deficiency.

The number of lower gears and the number of higher gears, for which the maximum permanent braking force curves are determined, can each be firmly specified, for example limited to two.

It is also possible, however, that the number of lower gears and the number of higher gears, for which the maximum permanent braking force curves are determined, are each determined as the number of gears up to and including the lower or higher gear respectively that can be reached with the maximum allowable gear step.

Since reaching the respective maximum permanent braking force requires a corresponding actuation of the existing permanent brakes, it can be provided for safety reasons, that the function for premature initiation and blocking a thrust downshift and/or a thrust upshift is only activated during Bremsomat operation.

BRIEF DESCRIPTION OF THE DRAWINGS

To illustrate the invention, a drawing having example embodiments follows the description. Shown are.

DETAILED DESCRIPTION OF THE PREFERRED EMBODIMENTS

Figure 1A:
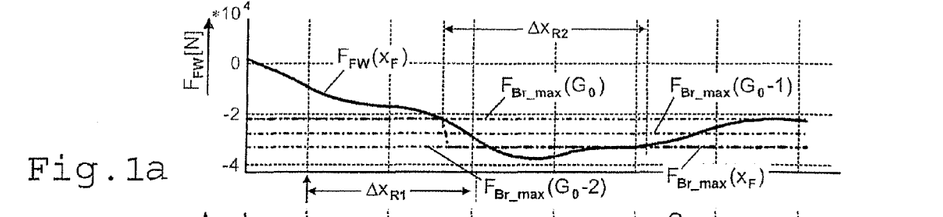
FIGS. 1a, 1b, 1c three graphs respectively showing a tractive resistance curve and a braking force curve, a gear curve and an engine speed curve (Part c), each across the travel section, in order to explain the premature initiation of a thrust downshift with decreasing tractive resistance, and FIGS. 2a, 2b, 2c three graphs respectively showing a tractive resistance curve and a braking force curve, a gear curve, and an engine speed curve, each across the travel section, in order to explain the premature initiation of a thrust upshift with increasing tractive resistance.
Figure 1B:
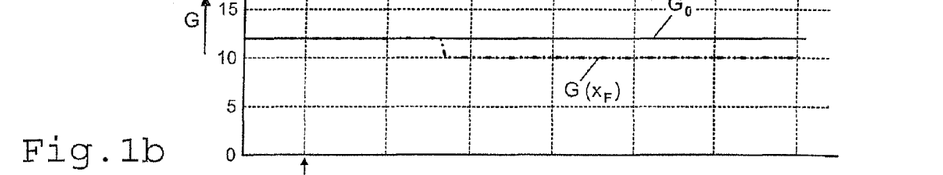
Figure 1C:
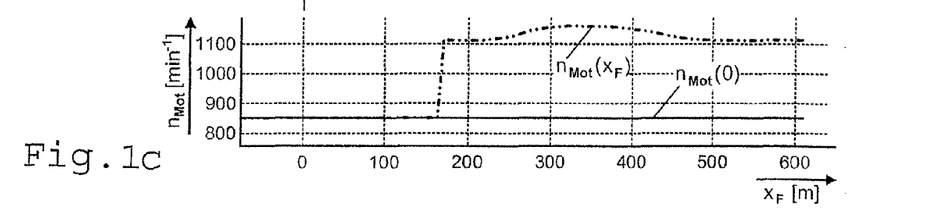

FIG. 1a shows the tractive resistance profile $F_{FW}(x_F)$ of a motor vehicle determined from topographic data across the travel section $x_F$, in particular the elevation profile for a stretch of road that lies ahead of the motor vehicle, wherein the current vehicle position corresponds to the waypoint $x_F=0$. Here, the motor vehicle is a heavy commercial vehicle with a vehicle mass of $m_{Fzg}=40,000$ kg. In FIG. 1b, $G_0=12$ indicates the currently engaged gear. In FIG. 1c, $n_{Mot}(0)=850$ min$^{-1}$ represents the current rotational speed of the drive motor.

In the operating phase shown in FIG. 1, the motor vehicle is in so-called Bremsomat operation, in which a target speed specified by the diver is maintained at a constant through the corresponding control of existing permanent brakes, such as an engine brake and a retarder, as long as the effective maximum possible permanent braking force $F_{Br\_max}$ to the drive wheels of the motor vehicle is less than or equal to, i.e. the amount is greater than or equal to, the respective (negative) tractive resistance $F_{FW}$.

The curve of the tractive resistance profile $F_{FW}(x_F)$ shows that the motor vehicle is in or immediately before a transition in a section of the road having a significantly greater downgrade of ca. 10%, in which a maximum amount of tractive resistance of approximately $F_{FW}=-40$ kN occurs. While with approximately $F_{Br\_max}=-22$ kN, the maximum permanent braking force $F_{Br\_max}$ in the currently engaged gear $G_0=12$ at the current point in time ($x_F=0$) is still sufficient to compensate for the tractive resistance $F_{FW}(0)$ and prevent an unwanted acceleration of the motor vehicle, this is no longer the case from approximately 170 m in front of the motor vehicle. From this waypoint ($x_F=170$ m), the (negative) tractive resistance $F_{FW}$, namely, falls below the maximum permanent braking force $F_{Br\_max}(G_0)$ in the currently engaged gear due to the increasing road gradient, so that the motor vehicle would then accelerate unintentionally without a timely thrust downshift.

In order to avoid this driving situation, the invention provides that the possible occurrence of such a driving situation be detected in advance and in this case, a thrust downshift be initiated in order to prematurely increase the maximum permanent braking force $F_{Br\_max}$, i.e. before this would occur due to the normal shift control or an active Bremsomat on the basis of current operating parameters and their gradients, where applicable.

For this purpose, topographic data pertaining to a stretch of road that lies ahead of the motor vehicle, in particular the elevation profile, is determined and the tractive resistance profile $F_{FW}(x_F)$ of the motor vehicle for the stretch of road that lies ahead is determined based on that data. In addition, the maximum permanent braking force curves $F_{Br\_max}(x_F)$ that are possible in the stretch of road that lies ahead in the currently engaged gear $G_0$ and in a specified number of lower gears are determined, the two lower gears ($G_0-1=11$ and $G_0-2=10$) in the present example, and assessed in relation to the tractive resistance profile $F_{FW}(x_F)$.

If the curve of the maximum permanent braking force $F_{Br\_max}(G_0)$ for the currently engaged gear $G_0$ based on the current vehicle position ($x_F=0$) now exceeds the curve of the tractive resistance $F_{FW}(x_F)$ within a specified first limit travel section of $\Delta x_{R1}=200$ m in the present example (or the tractive resistance profile $F_{FW}(x_F)$ falls below the curve of the maximum permanent braking force $F_{Br\_max}(G_0)$) and subsequently does not fall below that curve within a specified second limit travel section of $\Delta x_{R2}=250$ m in the present example, such a driving situation is said to have been detected in advance of the motor vehicle, so that a thrust downshift is then prematurely initiated. Otherwise, i.e. when at least one of these conditions is not met, a thrust downshift is blocked, so that it cannot be initiated by the normal shift control or by an active Bremsomat, for example because a shifting rotational speed or a target speed has been exceeded.

The highest possible respective low gear ($G_0-1$, $G_0-2$) is designated as the target gear for the relevant thrust downshift, for which the curve of the maximum permanent braking force $F_{Br\_max}(G_0-1)$, $F_{Br\_max}(G_0-2)$ does not exceed the curve of the tractive resistance $F_{FW}(x_F)$ after the occurrence of the braking force deficiency in the currently engaged gear $G_0$ within the second limit travel section $\Delta x_{R2}$.

Since these conditions are not met for either of the two lower gears ($G_0-1$, $G_0-2$) in the example shown in FIGS. 1a, 1b, 1c, the lowest of these two gears, thus $G=G_0-2=10$, is designated as the target gear for the thrust downshift. In the present example, the thrust downshift is carried out in the tenth gear, for example at the point in time when the braking force deficiency occurs, after approximately $x_F=170$ m. If necessary, however, this shifting can be initiated sooner, i.e. at any available point in time or waypoint $x_F$ between the current point in time ($t=0$, $x_F=0$) and the braking force deficiency that occurs at $x_F=170$ m, which, for example, can be controlled by starting a timer or odometer.

The thrust downshift is manifested as an abrupt increase in the (negative) maximum permanent braking force $F_{Br\_max}(x_F)$ (see FIG. 1a), in the change from the twelfth gear into the tenth gear (see FIG. 1b), and as an abrupt increase in the engine speed $n_{Mot}(x_F)$ from the current engine speed of approximately $n_{Mot}(0)=850$ min$^{-1}$ to approximately $n_{Mot}=1110$ min$^{-1}$ (see FIG. 1c).

FIG. 1a shows that the curve of the tractive resistance $F_{FW}(x_F)$ after implementing the thrust downshift falls below the maximum permanent braking force $F_{Br\_max}(x_F)$ at approximately $x_F=220$ m. However, since this is a temporary and rather limited occurrence, no additional thrust downshift is needed. The temporary acceleration brought about by the braking force deficiency, in which the acceleration is manifested as an abrupt increase in the engine speed $n_{Mot}(x_F)$ (see FIG. 1c), is subsequently quickly compensated for by a corresponding activation of the permanent brakes by the Bremsomat.

Figure 2A:
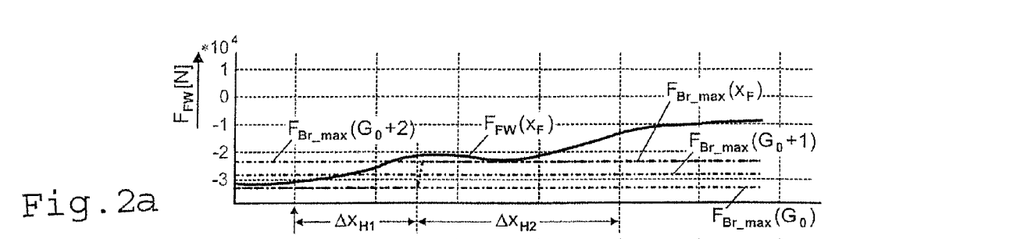
Figure 2B:
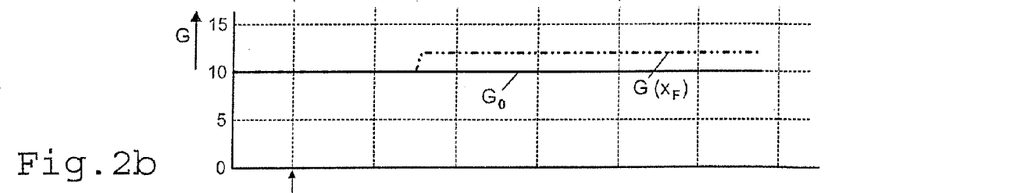
Figure 2C:
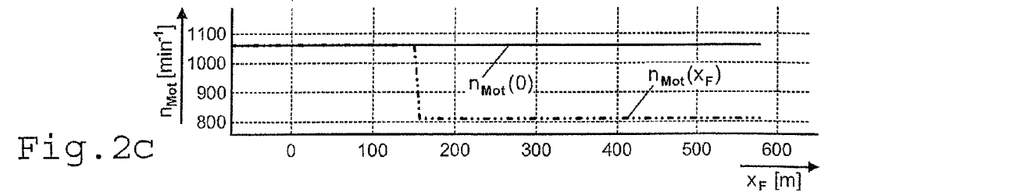

The graphs in FIGS. 2a, 2b, 2c, which are structured analogously to the graphs in FIGS. 1a, 1b, 1c, show an example of a driving situation in which the motor vehicle is in the thrust operation before a leveling off of the downgrade with the tenth gear engaged ($G_0=10$). A leveling off of the downgrade should be detected early, so that a thrust upshift can be initiated in a timely manner, whereby the momentum, i.e. the kinetic and potential energy, of the motor vehicle is better exploited and a transition can later be made into the traction mode in the level stretch.

To this end, according to the invention, in addition to determining the tractive resistance profile $F_{FW}(x_F)$ of the motor vehicle for the stretch of road that lies ahead, the maximum permanent braking force curves $F_{Br\_max}(x_F)$ that are possible in the stretch of road that lies ahead in the currently engaged gear $G_0$ and in a specified number of higher gears, the two higher gears ($G_0+1=11$ and $G_0+2=12$) in the present example, are also determined and evaluated in relation to the tractive resistance profile $F_{FW}(x_F)$.

If the curve of the maximum permanent braking force $F_{Br\_max}(x_F)$ for the currently engaged gear $G_0$ now is or falls below the curve of the tractive resistance $F_{FW}(x_F)$ based on the current vehicle position ($t=0$, $x_F=0$) within a specified first limit travel section of $\Delta x_{H1}=150$ m in the present example, i.e. a braking force surplus exists, and if the curve of the maximum permanent braking force $F_{Br\_max}(x_F)$ of at least one higher gear ($G_0+1$, $G_0+2$) subsequently does not exceed the curve of the tractive resistance $F_{FW}(x_F)$ within a specified second limit travel section of $\Delta x_{H2}=250$ m in the present example, i.e. a thrust upshift without braking force deficiency is possible, a leveling off of the downgrade in advance of the motor vehicle is the to have been detected. Accordingly, a thrust upshift is prematurely initiated in this case. Otherwise, i.e. if at least one of these conditions is not met, a thrust upshift is blocked so that it cannot be initiated by the normal shift control or by an active Bremsomat, for example because a shifting rotational speed or a target speed have a higher value.

The highest possible of the higher gears ($G_0+1=11$, $G_0+2=12$) is designated as the target gear for the corresponding thrust upshift, for which the curve of the maximum permanent braking force $F_{Br\_max}(G_0+1)$, $F_{Br\_max}(G_0+2)$ does not exceed the curve of the tractive resistance $F_{FW}(x_F)$ within the second limit travel section $\Delta x_{H2}$. In the present example, this applies to the second highest gear $G_0+2=12$, so that the thrust upshift occurs in this gear.

In the present example, the corresponding thrust upshift is initiated at the end of the first limit travel section $\Delta x_{H1}$, for example, i.e. based on the current position ($x_F=0$) after a travel section of $x_F=150$ m. If necessary, however, this shifting can be initiated earlier, i.e. at any available point in time or waypoint $x_F$ within the first limit travel section $\Delta x_{H1}$, which can be controlled, for example, by starting a timer or odometer.

The thrust upshift is manifested as an abrupt decrease in the (negative) maximum permanent braking force $F_{Br\_max}(x_F)$ (see FIG. 1a), in the change from the tenth gear into the twelfth gear (see FIG. 1b), and as an abrupt decrease in the engine speed $n_{Mot}(x_F)$ from the current engine speed of approximately $n_{Mot}(0)=1070$ min$^{-1}$ to approximately $n_{Mot}=810$ min$^{-1}$ (see FIG. 1c).

REFERENCE SYMBOLS $F_{FW}$ tractive resistance
$F_{FW}(0)$ current tractive resistance $F_{Luft}$ drag
$F_{Roll}$ rolling resistance
$F_{Steig}$ inclination resistance
$F_{Br\_max}$ maximum permanent braking force
G gear
$G_0$ currently engaged gear
$G_0-1$ next lowest gear
$G_0-2$ second lowest gear
$G_0+1$ next higher gear
$G_0+2$ second higher gear
$m_{Fzg}$ vehicle mass
$M_{Mot}$ engine torque
$M_{Mot}(0)$ current engine torque
n rotational speed
$n_{Mot}$ engine speed
$n_{Mot}(0)$ current engine speed
$n_G$ number of gears
$n_{GH}$ number of higher gears
$n_{GR}$ number of lower gears
t time, travel time
v speed
$v_{Soll}$ target speed
$v_F$ traveling speed
$v_F(0)$ current traveling speed
$x_F$ travel section, travel section variable
$\Delta t_{H1}$ limit travel time with emerging braking force surplus
$\Delta t_{H2}$ limit travel time with higher gear
$\Delta t_{R1}$ limit travel time with emerging braking force deficiency
$\Delta t_{R2}$ limit travel time with lower gear
$\Delta x_{H1}$ limit travel section with emerging braking force surplus
$\Delta x_{H2}$ limit travel section with higher gear
$\Delta x_{R1}$ limit travel section with emerging braking force deficiency
$\Delta x_{R2}$ limit travel section with lower gear

The invention claimed is:

1. A method of shift control for an automatic stepped variable speed transmission arranged positioned along a power train of a motor vehicle, which is provided with a permanent brake between a drive motor, designed as an internal combustion engine, and a final drive, the method comprising the steps of:
    determining current vehicle-specific, road-specific and driver-specific operating parameters for the vehicle;
    determining topographical data and an elevation profile, relating to a stretch of road that lies ahead of the vehicle while the vehicle is driving along the stretch of road;
    determining from the topographical data, the elevation profile, and the operating parameters, a tractive resistance value ($F_{FW}(x_F)$) of the vehicle, for the stretch of road that lies ahead of the vehicle;
    deriving and implementing control commands for at least one of thrust downshifts and thrust upshifts in an automatic mode of the stepped variable speed transmission, during a thrust operation, depending upon the tractive resistance value ($F_{FW}(x_F)$);
    determining maximum permanent braking force curves ($F_{Br\_max}(x_F)$) that are possible for the stretch of road that lies ahead of the vehicle in a currently engaged gear ($G_0$), and for each gear adjacent to the currently engaged gear, based on a current traveling speed ($v_F(0)$), a current engine speed ($M_{Mot}(0)$) and the tractive resistance value ($F_{FW}(x_F)$); and
    analyzing the maximum permanent braking force curves ($F_{Br\_max}(x_F)$) to derive control commands for the at least one of the thrust downshift and the thrust upshift in relation to the tractive resistance value ($F_{FW}(x_F)$) for controlling operation of the stepped variable speed transmission.

2. The method according to claim 1, further comprising the step of only activating premature initiation and blocking of the at least one of the thrust downshift and the thrust upshift during a Bremsomat operation.

3. A method of shift control for an automatic stepped variable speed transmission arranged positioned along a power train of a motor vehicle, which is provided with a permanent brake between a drive motor, designed as an internal combustion engine, and a final drive, the method comprising the steps of:
    determining current vehicle-specific, road-specific and driver-specific operating a parameters for the vehicle;
    determining topographical data and an elevation profile, relating to a stretch of road that lies ahead of the a motor vehicle while the vehicle is driving along the stretch of road;
    determining from the topographical data, the elevation profile, and the operating parameters, a tractive resistance value ($F_{FW}(x_F)$) of the vehicle, for the stretch of road that lies ahead of the vehicle;
    deriving and implementing control commands for at least one of thrust downshifts and thrust upshifts in an automatic mode of the stepped variable speed transmission, during a thrust operation, depending upon the tractive resistance value ($F_{FW}(x_F)$);
    determining maximum permanent braking force curves ($F_{Br\_max}(x_F)$) that are possible for the stretch of road that lies ahead of the vehicle in a currently engaged gear ($G_0$), and for each gear adjacent to the currently engaged gear, based on a current traveling speed ($v_F(0)$), a current engine speed ($M_{Mot}(0)$) and the tractive resistance a value ($F_{FW}(x_F)$);
    analyzing the maximum permanent braking force curves ($F_{Br\_max}(x_F)$) to derive control commands for the at least one of the thrust downshift and the thrust upshift in relation to the tractive resistance value ($F_{FW}(x_F)$) for controlling operation of the stepped variable speed transmission; and
    determining and evaluating the maximum permanent braking force curves ($F_{Br\_max}(G0)$, $FBr\_max(G_0-1)$, $F_{Br\_max}(G_0-2)$) that are possible for the stretch of road that lies ahead of the vehicle in the currently engaged gear ($G_0$) and in specified number of lower gears ($n_{GR}$), in relation to the tractive resistance value ($F_{FW}(x_F)$), to derive the control commands for a thrust downshift.

4. The method according to claim 3, further comprising the step of prematurely initiating the thrust downshift when the maximum permanent braking force curve ($F_{Br\_max}(G_0)$), for the currently engaged gear ($G_0$), exceeds the tractive resistance value ($F_{FW}(x_F)$) based on the current vehicle position (t=0, $x_F$=0) within either a specified first limit travel time ($\Delta t_{R1}$) or limit travel section ($\Delta x_{R1}$), and subsequently does not fall below the tractive resistance value ($F_{FW}(x_F)$) within either a specified second limit travel time ($\Delta t_{R2}$) or limit travel section ($\Delta x_{R2}$), and otherwise blocking the thrust downshift.

5. The method according to claim 4, further comprising the step of designating a highest possible respective low gear ($G_0-1$, $G_0-2$) as a target gear for the thrust downshift, for which the maximum permanent braking force curve ($F_{Br\_max}(G_0-1)$, $F_{Br\_max}(G_0-2)$) does not exceed the tractive resistance value ($F_{FW}(x_F)$), after occurrence of a braking force deficiency in the currently engaged gear ($G_0$) within the second limit travel time ($\Delta t_{R2}$) or the limit travel section ($\Delta x_{R2}$).

6. The method according to claim 4, further comprising the step of designating a lowest of the respective low gears ($G_0-2$) as a target gear for the thrust downshift, when the maximum permanent braking force curve ($F_{Br\_max}(x_F)$) of this gear exceeds the tractive resistance value ($F_{FW}(x_F)$) after occurrence of a braking force deficiency in the currently engaged gear ($G_0$) within the second limit travel time ($\Delta t_{R2}$) or the limit travel section ($\Delta x_{R2}$).

7. The method according to claim 3, further comprising the step of replacing the current tractive resistance value ($F_{FW}(0)$), in order to prematurely initiate a thrust downshift, with either a tractive resistance value at a waypoint in front of the motor vehicle or an average tractive resistance value ($F_{FW}(x_F)$) over the route area in front of the motor vehicle, in which the maximum permanent braking force curve ($F_{Br\_max}(G_0)$), for the currently engaged gear ($G_0$), lies above the tractive resistance value ($F_{FW}(x_F)$).

8. The method according to claim 3, further comprising the step of temporarily reducing a target speed ($v_{Soll}$) of a Bremsomat to initiate prematurely a thrust downshift during Bremsomat operation.

9. The method according to claim 3, further comprising the step of replacing the current tractive resistance value ($F_{FW}(0)$), to block a thrust downshift, with either a tractive resistance value at a waypoint in front of the motor vehicle, or an average tractive resistance value ($F_{FW}(x_F)$) over the route area in front of the motor vehicle, in which the maximum permanent braking force curve ($F_{Br\_max}(G_0)$) for the currently engaged gear ($G_0$) lies below the tractive resistance value ($F_{FW}(x_F)$).

10. The method according to claim 3, further comprising the step of temporarily increasing a target speed ($v_{Soll}$) of a Bremsomat to block a thrust downshift during a Bremsomat operation.

11. The method according to claim 3, further comprising the step of initiating prematurely a thrust downshift within either the travel time or travel section until occurrence of a braking force deficiency in the currently engaged gear ($G_0$), and initiating prematurely a thrust upshift within either first limit travel time ($\Delta t_{H1}$) or limit travel route ($\Delta x_{H1}$).

12. The method according to claim 3, further comprising the step of firmly specifying the number of lower gears ($n_{GR}$) and the number of higher gears ($n_{GH}$), for which the maximum permanent braking force curves ($F_{Br\_max}(xF)$) are determined.

13. The method according to claim 3, further comprising the step of determining, the number of lower gears ($n_{GR}$) and the number of higher gears ($n_{GH}$), for which the maximum permanent braking force curves ($F_{Br\_max}(x_F)$), as the number of gears up to and including the lower or the higher gear respectively that are reached with the maximum allowable gear steps.

14. A method of shift control for an automatic stepped variable speed transmission arranged positioned along a power train of a motor vehicle, which is provided with a permanent brake between a drive motor, designed as an internal combustion engine, and a final drive, the method comprising the steps of:

determining current vehicle-specific, road-specific and driver-specific operating parameters for the vehicle;

determining topographical data and an elevation profile, relating to a stretch of road that lies ahead of the a motor vehicle while the vehicle is driving along the stretch of road;

determining from the topographical data, the elevation profile, and the operating parameters, a tractive resistance value ($F_{FW}(x_F)$) of the vehicle, for the stretch of road that lies ahead of the vehicle;

deriving and implementing control commands for at least one of thrust downshifts and thrust upshifts in an automatic mode of the stepped variable speed transmission, during a thrust operation, depending upon the tractive resistance value ($F_{FW}(x_F)$);

determining maximum permanent braking force curves ($F_{Br\_max}(x_F)$) that are possible for the stretch of road that lies ahead of the vehicle in a currently engaged gear ($G_0$), and for each gear adjacent to the currently engaged gear, based on a current traveling speed ($v_F(0)$), a current engine speed ($M_{Mot}(0)$) and the tractive resistance value ($F_{FW}(x_F)$);

analyzing the maximum permanent braking force curves ($F_{Br\_max}(x_F)$) to derive control commands for the at least one of the thrust downshift and the thrust upshift in relation to the tractive resistance value ($F_{FW}(x_F)$) for controlling operation of the stepped variable speed transmission; and determining and evaluating the maximum permanent braking force curves ($F_{Br\_max}(G_0+1)$, $F_{Br\_max}(G_0+2)$) that are each possible for the stretch of road that lies ahead of the vehicle, for a specified number of higher gears higher gears ($n_{GH}$), in relation to the tractive resistance value ($F_{FW}(x_F)$) in order to derive control commands for the thrust upshift.

15. The method according to claim 14, further comprising the step of initiating prematurely a thrust upshift when the maximum permanent braking force curve ($F_{Br\_max}(G_0)$), for the currently engaged gear ($G_0$), either is or falls below the tractive resistance value ($F_{FW}(x_F)$) based on the current vehicle position (t=0, $x_F$=0) within either a specified first limit travel time ($\Delta t_{H1}$) or limit travel section ($\Delta x_{H1}$), and when the maximum permanent braking force curve ($F_{Br\_max}(G_0+1)$, $F_{Br\_max}(G_0+2)$) of at least one higher gear ($G_0+1$, $G_0+2$) subsequently does not exceed the tractive resistance value ($F_{FW}(x_F)$) within either a specified second limit travel time ($\Delta t_{H2}$) or limit travel section ($\Delta x_{H2}$), and otherwise blocking a thrust upshift.

16. The method according to claim 15, further comprising the step of designating a highest possible gear of the higher gears ($G_0+1$, $G_0+2$) as a target gear for the thrust upshift, for which the maximum permanent braking force curve ($F_{Br\_max}(G_0+1)$, $F_{Br\_max}(G_0+2)$) does not exceed the tractive resistance value ($F_{FW}(x_F)$), within either the second limit travel time ($\Delta t_{H2}$) or limit travel section ($\Delta x_{H2}$), and blocking a thrust upshift when this condition is not met by any of the higher gears ($G_0+1$, $G_0+2$).

17. The method according to claim 14, further comprising the step of replacing the current tractive resistance value ($F_{FW}(0)$), in order to initiate prematurely a thrust upshift, with either a tractive resistance value at a waypoint in front of the motor vehicle, or an average tractive resistance value ($F_{FW}(x_F)$) over the stretch of road the vehicle in which the maximum permanent braking force curve ($F_{Br\_max}(G_0)$), for the currently engaged gear ($G_0$), lies below the tractive resistance value ($F_{FW}(x_F)$).

18. The method according to claim 14, further comprising the step of temporarily increasing a target speed ($v_{Soll}$) of a Bremsomat in order to initiate prematurely a thrust upshift during a Bremsomat operation.

19. The method according to claim 14, further comprising the step of replacing the current tractive resistance value ($F_{FW}(0)$), in order to block a thrust upshift, with either a tractive resistance value at a waypoint in front of the vehicle or an average tractive resistance value ($F_{FW}(x_F)$) over a route area in front of the vehicle, in which the maximum permanent braking force curve ($F_{Br\_max}(G_0)$) for the currently engaged gear ($G_0$) lies above the curve of the tractive resistance ($F_{FW}(x_F)$).

20. The method according to claim 14, further comprising the step of temporarily reducing a target speed ($v_{Soll}$) of a Bremsomat in order to block a thrust upshift during a Bremsomat operation.

* * * * *